United States Patent [19]

Vizurraga

[11] 3,927,052
[45] Dec. 16, 1975

[54] CATALYST

[75] Inventor: Luis R. Vizurraga, Charlotte, N.C.

[73] Assignee: Fiber Industries Inc., Charlotte, N.C.

[22] Filed: May 11, 1973

[21] Appl. No.: 360,241

Related U.S. Application Data

[60] Division of Ser. No. 86,302, Nov. 2, 1970, Pat. No. 3,758,535, which is a continuation-in-part of Ser. No. 879,618, Nov. 24, 1969, abandoned.

[52] U.S. Cl.......... 260/429.7; 252/431 R; 260/75 C; 260/429 R; 260/429.3; 260/429.5; 260/435; 260/437; 260/446; 260/447; 260/448 R; 260/448 A; 260/448 AD; 260/448.2; 260/462 R; 260/462 A; 260/606.5 B; 260/606.5 P
[51] Int. Cl.²........................................ C07F 7/22
[58] Field of Search................................ 260/429.7

[56] References Cited

UNITED STATES PATENTS

| | | | |
|---|---|---|---|
| 2,937,995 | 5/1960 | Holdstock et al............ | 260/429.7 X |
| 2,998,440 | 8/1961 | Foster et al................. | 260/429.7 |
| 3,134,741 | 5/1964 | Merten et al................ | 260/429.7 X |

OTHER PUBLICATIONS

Chemical Abstracts, Vol. 48, 566b (1954).
Chemical Abstracts, Vol. 51, 3487i (1957).
Chemical Abstracts, Vol. 55, 18565i (1961).
Chemical Abstracts, Vol. 54, 9348h (1960).
J.A.C.S., Vol. 83, pp. 2963–2965, (1961).

Primary Examiner—Helen M. S. Sneed
Attorney, Agent, or Firm—Robert J. Blanke

[57] ABSTRACT

There is provided an improved polymerization catalyst which is the product of the process of reacting a first compound of the formula

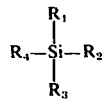

with a second compound of the formula

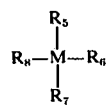

wherein:
1. M is selected from the group consisting of titanium, zirconium, germanium, silicon, antimony, lead, and tin;
2. $R_2$ and $R_4$ are selected from the group consisting of chlorine and hydroxy;
3. the remaining R substituents are selected from the group consisting of alkyl of 1 to about 18 carbon atoms, acyl of 1 to about 18 carbon atoms, alkoxy of 1 to about 18 carbon atoms, aryl of 6 to about 18 carbon atoms, aryloxy of 6 to about 18 carbon atoms, and hydrogen, provided that at least one of $R_5$, $R_6$, $R_7$, and $R_8$ is not hydrogen; and
4. in said reaction from about 1.1 to about 20 moles of said second compound per mole of said first compound are reacted for from about two to about 6 hours.

This catalyst is especially useful for the preparation of polyesters particularly linear fiber-forming polyesters.

4 Claims, No Drawings

CATALYST

This is a division of application Ser. No. 86,302, filed Nov. 2, 1970, now U.S. Pat. No. 3,758,535, which is a continuation-in-part of copending application Ser. No. 879,618 filed Nov. 24, 1969, and now abandoned.

This invention relates to novel polymerization catalysts which are especially useful in the preparation of polyesters.

Polymeric polyesters are prepared by heating together dihydric alcohols or their functional derivatives and dicarboxylic acids or their polyester-forming derivatives. Highly polymerized polyesters can be formed into molded articles, filaments, fibers, film, and the like which can be permanetly oriented. The most widely known and most commercially important of the polymeric polyesters is polyethylene terephthalate which normally is prepared by means of the ester-interchange reaction. The method comprises two steps. In the first step, ethylene glycol and dimethyl terephthalate are reacted at elevated temperatures and atmospheric pressure to form bis-beta-hydroxyethyl terephthalate monomer and methanol, and the methanol is removed continuously by distillation. Thereafter, in the second step, the bis-beta-hydroxyethyl terephthalate is heated at still higher temperatures and under reduced pressure to form polyethylene terephthalate with the elimination of ethylene glycol, which is readily removed under those conditions. The second step, or polymerization step, is continued until a polymer having the desired degree of polymerization, determined by viscosity measurement, is obtained with the aid of a suitable catalyst.

Many materials have been proposed in the past as catalysts for the ester-interchange reaction between the glycols and the dicarboxylic acid esters and for the second step (polycondensation) reaction. Metals in the form of powder, chips, ribbons, or wire have been suggested. Other catalysts suggested in the past have been alkali metal and alkaline earth metal alcoholates, alkali metal carbonates, or other alkaline reacting salts, alkaline earth oxides and litharge. Many of these materials are effective catalysts for the first ester-interchange step and some of them catalyze the condensation reaction. However, many of the substances that catalyze the condensation reaction carry the polymerization only to a low degree, or they do not promote the reaction effectively enough to give reaction rates acceptable for a commercial process.

The ortho alkyl titanates, such as tetraisopropyl titanate, tetrabutyl titanate, etc., have been suggested as catalysts for certain ester-interchange reactions. They are highly reactive liquid materials and are difficult to handle in small quantities. They hydrolyze readily, even on contact with moist air, and consequently apparatus in which they are used must be dry and the materials whose interaction they catalyze must be absolutely anhydrous to preclude hydrolysis.

Accordingly, it is an object of this invention to provide a new catalyst for the preparation of polyester by the reaction of a glycol and the diester of a dicarboxylic acid which effectively catalyzes both the ester-interchange and polycondensation reactions which occur, which is relatively stable to hydrolysis, and the use of which results in a polymer with good properties. It is a further object of this invention to provide a process for the use of said catalyst.

In accordance with this invention, there is provided the product of the process of reacting a first compound of the formula

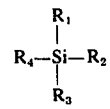

with a second compound of the formula

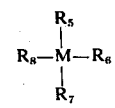

wherein:
1. M is selected from the group consisting of titanium, zirconium, germanium, silicon, antimony, lead, and tin;
2. $R_2$ and $R_4$ are selected from the group consisting of chlorine and hydroxy;
3. the remaining R substituents are selected from the group consisting of alkyl of 1 to about 18 carbon atoms, acyl of 1 to about 18 carbon atoms, alkoxy of 1 to about 18 carbon atoms, aryl of 6 to about 18 carbon atoms, aryloxy of 6 to about 18 carbon atoms, and hydrogen, provided that at least one of $R_5$, $R_6$, $R_7$, and $R_8$ is not hydrogen; and
4. in said reaction from about 1.1 to about 20 moles of said second compound per mole of said first compound are reacted for from about two to about 6 hours; and
5. after said first compound and said second compound have been reacted with each other for from about 1.0 to about 6 hours, the reaction mixture is subjected to a vacuum of less than about 600 millimeters of mercury absolute for at least 30 minutes.

There is also provided a process for preparing a polyester comprising condensing a lower dialkyl ester of a dicarboxylic acid with a glycol, the improvement which comprises condensing said ester and said glycol in the presence of from about 0.01 to about 2.0 percent (by weight of said ester) of the product of the process of reacting a first compound of the formula

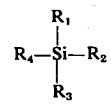

with a second compound of the formula

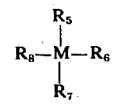

wherein:
1. M is selected from the group consisting of boron, aluminum, silicon, indium, ytrium, germanium, tin, lead, titanium, zirconium, phosphorous, arsenic, antimony, carbon, bismuth, vanadium, and tantalum;
2. $R_2$ and $R_4$ are selected from the group consisting of chlorine and hydroxy;

3. the remaining R substituents are selected from the group consisting of alkyl of 1 to about 18 carbon atoms, acyl of 1 to about 18 carbon atoms, alkoxy of 1 to about 18 carbon atoms, aryl of 6 to about 18 carbon atoms, aryloxy of 6 to about 18 carbon atoms, and hydrogen, provided that at least one of $R_5$, $R_6$, $R_7$, and $R_8$ is not hydrogen; and 4. in said reaction from about 0.1 to about 20 moles of said second compound per mole of said first compound are reacted for from about 1.0 to about 6 hours.

This invention also provides the analagous direct esterification process for preparing a polyester comprising the steps of directly esterifying a dicarboxylic acid with a glycol to form a "monomer" and polycondensing the monomer so formed, the improvement which comprises polycondensing said monomer in the presence of from about 0.01 to about 2.0 percent (by weight of said acid) of the product of the process of reacting a first compound of the formula

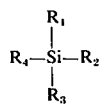

with a second compound of the formula

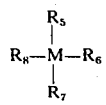

wherein:
1. M is selected from the group consisting of boron, aluminum, silicon, indium, ytrium, germanium, tin, lead, titanium, zirconium, phosphorous, arsenic, antimony, carbon, bismuth, vanadium, and tantalum;
2. $R_3$ and $R_4$ are selected from the group consisting of chlorine and hydroxy;
3. the remaining R substituents are selected from the group consisting of alkyl of 1 to about 18 carbon atoms, acyl of 1 to about 18 carbon atoms, alkoxy of 1 to about 18 carbon atoms, aryl of 6 to about 18 carbon atoms, aryloxy of 6 to about 18 carbon atoms, and hydrogen, provided that at least one of $R_5$, $R_6$, $R_7$, and $R_8$ is not hydrogen; and
4. in said reaction from about 0.1 to about 20 moles of said second compound per mole of said first compound are reacted for from about 1.0 to about 6 hours.

The catalysts of the present invention vary from liquid materials to solid compounds and exhibit great stability to hydrolysis. They are soluble in most common organic solvents such as toluene, benzene, acetone, glycols, esters, etc. They are extremely stable to hydrolysis when used as a solution in a glycol.

The catalysts of the present invention are especially useful for the preparation of polyesters. The term "polyester", as used herein, refers to a long chain synthetic polymer composed of at least 85 percent (by weight) of an ester of a dihydric alcohol and a dicarboxylic acid.

The catalysts of the present invention are especially useful for the preparation of polyesters by the condensation of a glycol with a dicarboxylic acid or the lower dialkyl ester thereof wherein each ester moiety has from 2 to about 9 carbon atoms. These polyesters are useful for the production of shaped articles such as fibers, films, injection molded articles, laminates, etc. Some of the dicarboxylic acids which work well in the process of this invention iunclude, e.g., aliphatic dicarboxylic acids of the formula

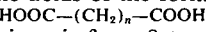

wherein $n$ is from 0 to about 10 such as oxalic acid, malonic acid, succinic acid, glutaric acid, adipic acid, pimelic acid, suberic acid, azelaic acid, sebacic acid, isosebacic acid, and the like; aromatic carboxylic acids of from about 8 to about 18 carbon atoms such as terephthalic acid, phthalic acid, isophthalic acid, diphenic acid, 2,6-naphthalenedicarboxylic aicd, 3-nitrophthalic acid, 1,4-naphthalenedicarboxylic acid, 4,4' dicarboxybiphenyl, bis(4-carboxyphenyl) sulfone, and the like; "dimer acids", i.e., those acids containing a plurality of carboxyls which result through Diels-Alder ethylenic reaction of drying oil acids such as linoleic acid or linolenic acid, alicyclic dicarboxylic acids of from about 6 to about 12 carbon atoms such as trans-1,2-cyclobutanedicarboxylic acid, 1,2-cyclopentanedicarboxylic acid, etc., unsaturated dicarboxylic acids of from about 4 to about 18 carbon atoms such as maleic acid, fumaric acid, and the like, hydroxy aromatic acids of the formula

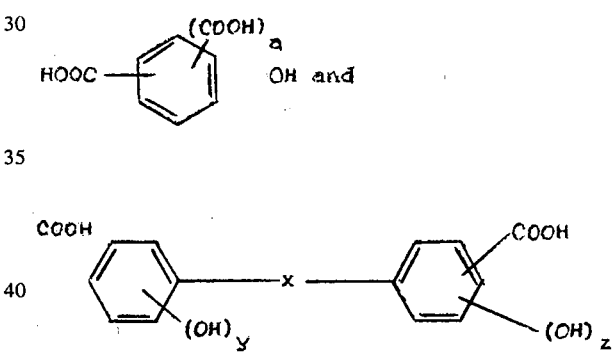

wherein $a$, $y$, and $z$ are either 0 or 1, at least one of $y$ and $z$ being 1, and $x$ is either a direct bond between the two benzene rings or is selected from the group consisting of $-(CH_2)_y-(CR_2)_z-$ wherein R is hydrogen or alkyl of 1 to about 18 carbon atoms, $-O(CH_2)_y (OR_2)_z$

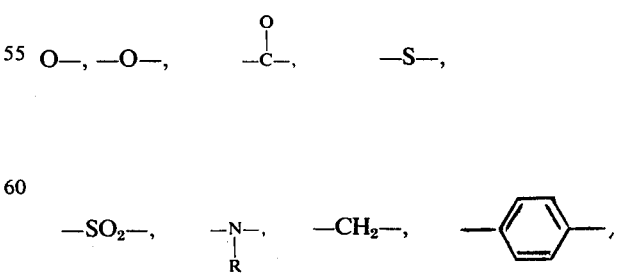

and $-RC = OR-$ as exemplified by such acids as 4-hydroxybenzoic acid, 2-hydroxyterephthalic acid, 5-hydroxyisophthalic acid, 6-hydroxyisophthalic acid, 3-hydroxyphthalic acid, 4-hydroxyphthalic acid, bis(4- carboxy-2-hydroxyphenyl) methane, 1,1-bis(4-carboxy-2-hydroxyphenyl) ethane, 2,2-bis(4-carboxy-3-hydroxyphenyl) propane, bis(3-carboxy-4-hydroxyphenyl)sulfone, bis(4-carboxy-3-hydroxyphenyl)sulfone, bis(3-carboxy-4-hydroxyphenyl) sulfide, bis(4-carboxy-3-hydroxyphenyl) sulfide, 4,4'-dicarboxy-3,3' dihydroxybiphenyl, and the like; dicarboxylic acids having elements other than carbon, hydrogen, or oxygen such as 5-sodium sulfoisophthalic acid, 3,5-dicarboxybenzylsulfonic acid, and the like; and other dicarboxylic acids such as hexahydroterephthalic acid, 2,8-dibenzofurandicarboxylic acid, 1,4-bicycle (2.2.2)octanedicarboxylic acid, etc.

In the process of this invention it is preferred that the aromatic moiety with which the glycol is reacted to form polyester be a lower dialkyl ester of a dicarboxylic acid. The dialkyl esters of any of the aforementioned dicarboxylic acids work well in the process of this invention, especially those esters wherein each —COOR group contains from about 2 to about 9 carbon atoms. The preferred esters are the lower dialkyl esters of phthalic acid. These are of the formula

wherein R is alkyl of from 1 to about 8 carbon atoms, preferably from 1 to about 4 carbon atoms. The most preferred ester is the dimethyl ester of terephthalic acid, dimethyl terephthalate The novel catalysts of this invention will work effectively with virtually any of the aforementioned acids or the esters thereof and a diol such as, e.g., a diol of the formula

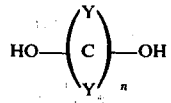

wherein $n$ is from about 2 to about 20; Y is selected from the group consisting of hydrogen, halogen, alkyl of 1 to about 18 carbon atoms, aryl of from 6 to about 18 carbon atoms, aralkyl of up to about 30 carbon atoms, substituted alkyl of from 1 to about 18 carbon atoms wherein the substituents are selected from the group consisting of fluorine, chlorine, bromine, and iodine, and substituted aryl of from 6 to about 18 carbon atoms wherein the substituents are as hereinbefore described; the Y substituents on any one carbon atom may be the same or different and the $$\begin{array}{c} Y \\ -C- \\ Y \end{array}$$

groups may be the same or different, i.e., the Y substituents on any two adjacent carbon atoms may be the same or may be different. The preferred class of diols are those wherein Y is hydrogen, alkyl, or substituted alkyl and the sum of the carbon atoms in the Y substituents does not exceed 30. An even more preferred class of diols is of the formula HO—(CH$_2$)$_n$—OH wherein $n$ is from 2 to about 10. The most preferred class of diols occurs when $n$ is from 2 to 4.

Some of the preferred esters of the process of this invention include, e.g., esters of the formula

wherein R and R' are substituents containing from 1 to about 8 carbon atoms. It is preferred that R and R' be alkyl substituents and that they contain from 1 to about 4 carbon atoms. The most preferred esters include, e.g., dimethyl terephthalate, di-n-propylterephthalate, di-i-propylisophthalate, diamylphalate, diphenyl terephthalate, methylethylterephthalate, di-2-ethylhexylisophthalate, n-butyl-i-propylterephthalate, diethylisophthalate, dimethylphthalate, etc. It is preferred that the ester be a lower dialkyl ester (of 1 to about 4 carbon atoms) of terephthalic acid, although the lower dialkyl esters of phthalic acid and isophthalic acid also work well in the process of this invention. Either symmetrical or unsymmetrical lower dialkyl esters work well in the process of this invention.

Some of the diols which work well in the process of this invention include, e.g., ethylene glycol, propylene glycol, 1,4-butanediol, 1,4-pentanediol, 1,4-decanediol, 2,5-hexanediol, 3,6-octanediol, 4,7-decanediol, 2-methyl-1,4-pentanediol, 2,2,4-trimethyl-1,4-pentanediol, 2,5-dimethyl-2,5-hexanediol, 3,6-dimethyl-3,6-octanediol, 5,6-dimethyl-4,7-decanediol, cis or trans-1,4-(α, α, α, α-tetramethyl)-cyclohexanedimethanol, 1,4-diphenyl-1,4-butanediol, 3,4-diphenyl-2,6-hexanediol, 1,1, 4,4-tetraphenyl-1,4-butanediol, 1,2-acenaphthenedimethanol, 1,5-pentanediol, 1,5-hexanediol, 1,5-decanediol, 2,6-heptanediol, 3,7-nonanediol, 3-methyl-1,5-pentanediol, 2,2-dimethyl-1,5-pentanediol, 2,4,6,8-tetramethyl-3,7-nonanediol, 2,2,3,3, 4,4-hexafluro-1,5-pentanediol, 2,4-dimethyl-2,4-bis(ethoxymethyl) 1,5-pentanediol, 3,5-dimethyl-3,5-bis(methoxymethyl)-2,4-heptanediol, 1,5-diphenyl-1,5-pentanediol, 3,3-diphenyl-1,5-pentanediol, 2,4-dimethyl-1,5-diphenyl-1,5-pentanediol, 1,3,5-triphenyl-1,5-pentanediol, 1,1,5,5-tetraphenyl-1,5-pentanediol, 3-(α-naphthyl)-1,5-pentanediol, 2,4-di(β-naphthyl)-1,5-pentanediol, 1,6-hexanediol, 1,7-heptanediol, 1,8-octanediol, 1,9-nonanediol, 1,10-decanediol, and the like.

It is preferred to use from about 0.01 to about 2.0 weight percent (based on the weight of the dicarboxylic acid or the dialkyl ester thereof) of catalyst in the process of this invention, although it is more preferred to use from about 0.01 to about 0.5 weight percent of said catalyst.

In one of the preferred embodiments of this invention, the catalyst described hereinabove is used to prepare poly(ethylene terephthalate) by the reaction of ethylene glycol and dimethyl terephthalate or terephthalic acid, it being preferred to use dimethyl terephthalate. In the first stage of the reaction wherein dimethyl terephthalate is used, the "ester-interchange" step, a simple ester-interchange takes place, with DMT and ethylene glycol reacting to form bis-beta-hydroxyethyl terephthalate. This portion of the reaction is carried out at atmospheric pressure and at a temperature in the range of 100° to 250° centigrade (and preferably between 150° and 220° centigrade). If desired, the reaction may be carried out at pressure above or below atmospheric. During the first stage, methanol is evolved which may be continuously removed by distillation. At the completion of the first stage, the excess glycol, if any, may be distilled off prior to entering the second stage of the reaction.

The second stage, or polymerization stage, may be conducted at reduced pressure. For optimum results, a pressure within the range of less than about 1.0 millimeters and up to about 5.0 millimeters of mercury may be employed. This reduced pressure removes the free ethylene glycol that is formed during this stage of the reaction. The polymerization step is conducted at a temperature within the range of 200° to 400° centigrade.

The polymerization step of second stage may be effected either in the liquid, melt, or solid phase. In the liquid phase, particularly, reduced pressures must be employed in order to remove the free ethylene glycol which emerges from the polymer as a result of the condensation reaction.

When employing procedures heretofore known in the art, the ester-interchange portion of the reaction has taken place in approximately 3.0 to 6.0 hours. However, when employing the process of the present invention using the new catalyst disclosed herein, the first step takes place in 0.5 to 2.0 hours. Similarly, the polymerization or second step has heretofore taken place in approximately 2.0 to 4.0 hours, depending on catalyst concentration, temperature, viscosity desired, and the size of the batch of polymer to be prepared. With the present process of the polymerization step takes place in approximately 0.5 to 2.0 hours.

For commercial operation, it is highly desirable to have as short a polymerization cycle as possible, mainly to increase productivity and subject the polymer to elevated temperatures for a minimum time. Long polymerization cycles at elevated temperatures tend to initiate side reactions which degrade not only the color of the polymer but also the intrinsic viscosity.

The catalyst systems suggested in the past have indicated limitations in their capabilities; for example processes using them are unable to obtain high molecular weight polytetramethylene terephthalate, and the polymer chips produced therein, after drying in air for 3 hours at 170° centigrade prior to spinning, have shown discoloration, providing a product with poor qualities for commercial applications. All of these disadvantages have been eliminated when using the catalysts of the present invention.

The novel compositions of this invention can be synthesized with a wide range of metal-silicon content via, e.g., the co-hydrolysis technique.

The catalytic compositions of this invention are prepared by reacting a first compound of the formula

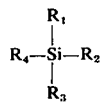

with a second compound of the formula

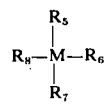

wherein M and the substituents are as hereinbefore described.

It is preferred that M be selected from the group consisting of titanium, antimony, germanium, aluminum, tin, zirconium, bismuth, and silicon; it is even more preferred that M be selected from the group consisting of titanium, silicon, and tin. $R_1$ and $R_3$ preferably should be either alkyl of 1.0 to about 18 carbon atoms or aryl of from 6 to about 18 carbon atoms; it is most preferred that these substituents be phenyl. It is preferred that $R_5$, $R_6$, $R_7$, and $R_8$ be selected from the group consisting of phenyl, alkyl of 1 to about 18 carbon atoms, and alkoxy of about 1 to 18 carbon atoms. It is more preferred that these R substituents be selected from the group consisting of alkyl of 1 to about 8 carbon atoms and alkoxy of 1 to about 8 carbon atoms. It is most preferred that these substituents be alkoxy of 1 to about 8 carbon atoms. When M is titanium, in the most preferred embodiment these substituents are $-OC_3H_7$. When M is silicon, the most preferred embodiment is $-OC_2H_5$.

The reaction time is from about 1.0 to about 6 hours. When M is titanium it is preferred that the reaction time be from about 2.5 to about 5 hours; and the most preferred reaction time is from about 3 to about 4 hours. When M is silicon it is preferred that the reaction time be from about 3 to about 6 hours, and it is even more preferred that the reaction time be from about 3.5 to about 5.0 hours; the most preferred reaction time is about 4 hours.

The reaction temperature is from about 50° to about 250° centigrade. When M is titanium, the preferred reaction temperature is from about 50° to about 220° centigrade and the most preferred reaction temperature is from about 50° to about 180° centigrade. When M is silicon it is preferred to use a reaction temperature of from about 90° to about 230° centigrade, although the more preferred reaction temperature is from about 100° to about 180° centigrade and the most preferred reaction temperature is from about 120° to about 150° centigrade.

In said reaction the mole ratio of said second compound to said first compound is from about 0.1 to about 20. The preferred compositions of this invention are made when said mole ratio is from about 1.1/1 to about 20/1. It is more preferred to use a mole ratio of from about 1.5/1 to about 10/1, and it is most preferred to use a mole ratio of from about 1.5/1 to about 5/1.

After said reaction has been carried on for the specified amount of time, it is preferred to subject the reaction mixture to a vacuum of less than about 600 millimeters absolute for at least 30 minutes while holding it at about the reaction temperature used to effect the reaction. It is more preferred to subject said reaction mixture to a vacuum of less than about 100 millimeters of mercury absolute for from about 0.5 to about 6 hours. In the most preferred embodiment said reaction mixture is subjected to a vacuum of less than about 50 millimeters of mercury for from about 0.5 to about 2.0 hours.

In another of the preferred embodiments of this invention the catalyst described hereinabove is used to prepare poly (ethylene terephthalate) via the direct esterification of ethylene glycol and terephthalic acid; a typical direct esterification process wherein applicant's catalyst is useful is described, e.g., in U.S. Pat. No. 3,050,533. Although it is preferred to use said catalyst only during the polycondensation phase, it may be present during both direct esterification and polycondensation.

It is preferred via applicant's invention to make polyester films or fibers. The polymer from which said films or fibers are made should have an intrinsic viscosity of from about 0.1 to about 1.3. The term "intrinsic viscosity" as used with reference to polyester polymers may be defined as the limit of the ratio of solution viscosity to solvent viscosity taken from one (1) divided by the concentration of the polymer in solution as the concentration approaches zero $$\left(\genfrac{}{}{0pt}{}{\eta}{c \to 0} = \frac{\text{Lim } \eta - \eta_s}{c\, \eta_s}\right).$$

Measurements may be made of relative viscosity (on a 8 percent solution of polyester in orthochlorophenol at 25° centigrade) and converted to intrinsic viscosity by an emperical formula. It is preferred that fiber on film be made from polymer with intrinsic viscosity of from about 0.4 to about 0.8 via applicant's process, and it is most preferred that the process of applicant's invention be used to make polymer with an intrinsic viscosity of from about 0.5 to about 0.75.

In order to better illustrate applicant's invention, the following Examples, which are in no way to be deemed limitative of the invention, are presented. Unless otherwise stated, all parts are by weight and temperature are in degrees centigrade.

EXAMPLE 1

43.4 grams (0.2 moles) of purified diphenyl silanediol were placed in a vessel equipped with stirrer, and addition funnel and a short distillation column connected to a vacuum system. 113.7 grams (0.4 moles) of tetraisopropyl titanate was added in a period of two minutes. An exothermic reaction was observed resulting in a batch temperature of 36° centigrade. The reactants were gently heated to 53° centigrade under constant stirring. The condensation product, isopropyl alcohol, was removed quantitatively (2.0 moles) under reduced pressure (300 millimeters of mercury pressure) in a period of 3.5 hours. 130.2 grams of product were obtained (98.0 percent yield) which upon cooling had the appearance of a thick slightly cloudy tan colored liquid.

Either alkyl, aryl or aralkyl titanates, or titanates containing mixtures of such substituents, can be used as starting materials to prepare the catalysts of the invention. Representative examples are tetramethyl titanate, tetraethyl titanate, tetrapropyl titanate, tetraisopropyl titanate, tetrabutyl titanate, tetraphenyl titanate, tetratolyl titanate, methyl triphenyl titanate, ethyl triphenyl titanate, butyl triphenyl titanate, dipropyldiphenyl titanate, dibutyl diphenyl titanate, trimethylphenyl titanate, triethylphenyl titanate, tripropyl phenyl titanate, tributyl phenyl titanate, tetrabenzyl titanate, butyltribenzyl titanate dibutyl dibenzyl titanate, and tributyl-benzyl titanate.

EXAMPLE 2

2.16 grams (0.01 moles) of purified diphenylsilanediol were placed in a vessel equipped with an addition funnel and a short distillation column connected to a vacuum system. 7.10 grams (0.02 moles) of tin tetraisopropoxide was added in a period of about 1 minute. The reactants were gently heated to 60° centigrade under constant stirring. The condensation product, isopropyl alcohol was removed quantitatively (0.02 moles) under reduced pressure (300 millimeters of mercury) in a period of about 1.0 hours. 7.86 grams of product were obtained (97.6 percent yield) which upon cooling had the appearance of a thick tan colored paste. Either alkyl, aryl, or aralkyl tin compounds, or intermediates containing mixtures of such substituents, can be used as starting materials to prepare these types of tin compounds.

EXAMPLE 3

In the manner described in Example 2, 6.48 grams (0.03 moles) of diphenylsilanediol was placed in the reaction vessel. 15.36 grams (0.06 moles) of antimony triethoxide was added in a period of about 1 minute. The reactants were gently heated to about 65° centigrade under constant stirring. The condensation product, ethyl alcohol (0.06 moles) was removed quantitatively under reduced pressure (200 millimeters of mercury) in a period of about 1.5 hours. 19.0 grams of product were obtained (95 percent yield) which upon cooling had the appearance of thick light-tan colored paste. Either alkyl, aryl, or aralkyl antimony compounds, or intermediates containing mixtures of such substituents, can be used as starting materials to prepare these types of antimony compounds.

EXAMPLE 4

In accordance with the procedure described in Example 3, 9.825 grams (0.03 moles) of tetraisopropyl zirconate was placed in the reaction vessel under a nitrogen blanket. A solution of 3.24 grams (0.015 moles) of diphenylsilanediol in 19.197 grams of anhydrous methanol was added in a period of about one minute. The reactants were gently heated to about 50 degrees centigrade under constant stirring. The condensation product, isopropyl alcohol, was removed quantitatively (0.03 moles) under reduced pressure (360 millimeters of mercury) in a period of about 3.0 hours. 10.95 grams of product were obtained (97 percent yield) which upon cooling had the appearance of a white powder. Either alkyl, aryl, or aralkyl zirconium compounds, or intermediates containing mixtures of such substituents, can be used as starting materials to prepare these types of zirconium compounds.

EXAMPLE 5

In accordance with the procedure described in Example 3, 5.40 grams (0.025 moles) of diphenylsilanediol was placed in the reaction vessel. 12.64 grams (0.05 moles) of tetraethoxy germanium was added in a period of 3 minutes. The reactants were gently heated to about 65° centigrade under constant stirring. The condensation product, ethyl alcohol, was removed quantitatively (0.05 moles) under reduced pressure (40 millimeters of mercury) in a period of about 1.0 hours. 15.35 grams of product (water clear liquid) were obtained (97 percent yield). Either alkyl, aryl, or aralkyl germanium compounds, or intermediates containing mixtures of such substituents, can be used as starting materials to prepare these types of germanium compounds.

EXAMPLE 6

In accordance with the procedure described in Example 3, 3.24 grams (0.015 moles) of diphenylsilanediol were placed in the reaction vessel. 33.78 grams (0.03 moles) of tetrastearyl titanate was added in a period of 1 minute under a nitrogen blanket. The reactants were gently heated to about 115° centigrade under constant stirring and allowed to react for about 6.0 hours. The end product was a slight tan colored solid with 77 percent of active catalyst content.

EXAMPLE 7

In the manner described in Example 3, 4.886 grams (0.02 moles) of diphenyl dimethoxy silane were placed in the reaction vessel. 14.68 grams (0.04 moles) of triphenyl tin hydroxide was added in a period of 1 minute under a nitrogen blanket. The reactants were gently heated to about 51° centigrade under constant stirring. The condensation product, methanol, was removed quantitatively (0.04 moles) under reduced pressue (200 millimeters of mercury) in a period of about 50 minutes. 18.28 grams of product (100 percent yield) were obtained having the appearance of a thick slightly tan paste.

EXAMPLE 8

In the manner described in Example 3, 3.24 grams (0.015 moles) of diphenylsilanediol were placed in the reaction vessel. 11.375 grams (0.03 moles) of dibutyl tin dibutoxide was added in a period of 1 minute under a nitrogen blanket. The reactants were gently heated to about 107° centigrade under constant stirring. The condensation product, butyl alcohol, was removed quantitatively (0.03 moles) under reduced pressure (20 millimeters of mercury) in a period of about 50 minutes. 12.061 grams of product (96 percent yield) were obtained which upon cooling had the appearance of a light amber highly viscous transparent liquid.

EXAMPLE 9

In accordance with the procedure described in Example 3, 5.41 grams (0.025 moles) of diphenylsilanediol and 7.61 grams (0.05 moles) of tetramethoxysilane were allowed to react in the presence of 10 cubic centimeters of an ethyl alcohol solution containing 0.1 grams of NaOH. The reactants were gently heated up to about 88° centigrade under constant stirring. The condensation product, methanol, was removed quantitatively (0.05 moles) under reduced pressure (600 millimeters of mercury) in a period of about 4.0 hours. 11.362 grams of product (98.6 percent yield) were obtained which upon cooling had the appearance of a water clear liquid with a boiling point of about 233° centigrade.

EXAMPLE 10

In the manner described in Example 9, 43.28 grams (0.2 moles) of diphenylsilanediol and 83.32 grams (0.4 moles of tetraethoxysilane) were allowed to react in the presence of 25 cubic centimeters of an ethyl alcohol solution containing 0.242 grams of NaOH. The reactants were gently heated up to about 120° centigrade under constant stirring. The condensation product, ethanol, was removed quantitatively (0.04 moles) under reduced pressure (500 millimeters of mercury) in a period of about 5.0 hours. 105.8 grams of product (97.5 percent yield) were obtained which upon cooling had the appearance of a water clear liquid.

EXAMPLE 11

In accordance with the procedure of Example 10, 13.815 grams (0.05 moles) of triphenylsilanol and 6.32 grams (0.025 moles) of tetraethoxygermanium were allowed to react in the presence of 5 cubic centimeters of an ethyl alcohol solution containing 0.005 grams of NaOH. The reactants were gently heated to about 105 degrees centigrade under constant stirring. The condensation product, ethyl alcohol, was removed quantitatively (0.05 moles) under reduced pressure (500 millimeters of mercury) in a period of about 5.5 hours. 17.11 grams of product (96.0 percent yield) were obtained which upon cooling had the appearance of a light tan paste.

EXAMPLE 12

In accordance with the procedure of Example 11, 22.02 grams (0.06 moles) of triphenylsilanol and 10.23 grams (0.03 moles) of antimony tributoxide were allowed to react in the presence of 10 cubic centimeters of a butyl alcohol solution containing 0.010 grams of NaOH. The reactants were gently heated to 162° centigrade under constant stirring under reduced pressure (from about 300 to about 500 millimeters of mercury). The condensation product, butyl alcohol, was removed quantitatively (0.06 moles) in approximately 5.5 hours. 29.71 grams (97.7 percent yield) of product were obtained which upon cooling had the appearance of a thick white paste.

EXAMPLE 13

In accordance with the procedure of Example 1, 157.86 grams (0.45 moles) of dibutyl tin diacetate were placed in the reaction vessel. 187.2 grams (0.9 moles) of tetraethoxysilane were added in a period of about 1 minute. The reactants were gently heated to about 120° centigrade with constant stirring. 79.2 grams (0.9 moles) of ethyl acetate was removed under reduced pressure (540 millimeters of mercury) in a period of about 2 hours. Thereafter the vacuum was slowly reduced down to 20 millimeters of mercury absolute in a period of about 1.5 hours, and 93.6 grams (0.45 moles) of tetraethoxysilane) were collected. The product had the appearance of a very viscous light-tan colored liquid.

EXAMPLE 14

In accordance with the procedure of Example 1, 1082.0 grams (5 moles) of diphenylsilanediol were placed in the reaction vessel. 2842.0 grams (10 moles) of tetraisopropyl titanate were added in a period of about 4 minutes. The reactants were gently heated to a temperature of 100° centigrade under constant stirring. 600.0 grams (10 moles) of isopropyl alcohol were removed under a reduced pressure of 300 millimeters of mercury absolute over a period of about 1 hour. Then the batch temperature was rapidly increased to about 155° centigrade and the vacuum was slowly reduced down to about 4.5 millimeters of mercury absolute. After about 1.5 hours 1422.0 grams (5 moles) of tetraisopropyl titanate were removed. The product upon cooling was a think, slightly cloudy, tan colored liquid.

Nuclear magnetic resonance analysis, gas chromotography analysis, liquid chromotography analysis, and elemental analysis show that the reaction product was a mixture of at least 3 different components.

EXAMPLE 15

4,264 grams (16.0 moles) of diphenyldichlorosilane and 64.3 grams of zinc chloride were introduced into a reaction flask, the reaction flask was purged with nitrogen, the diphenyldichlorosilane was heated to a temperature of about 120° centigrade, and 8,220 grams (39.5 moles) of tetraethylorthosilicate were added dropwise to the flask. After the addition of the tetraethylorthosilicate, the batch temperature was increased to about 180° centigrade; fractionation of the ethyl chloride continued for an additional 3 hours, and at the end of this period 2,062 grams (32.0 moles) of ethyl chloride were collected. The batch temperature was then further increased to about 220° centigrade and a vacuum of about 300 millimeters of mercury was imposed upon the reaction mixture. In this manner 1,435 grams (6.9 moles) of tetraethylorthosilicate were collected. The product obtained was filtered until it was free of insoluble particles. It had the appearance of a water-clear fluid. Nuclear magnetic resonance analysis, gas chromotography analysis, liquid chromatography analysis, and elemental analysis indicated that the reaction product was a mixture of at least 3 components.

EXAMPLE 16

600.0 grams of dimethyl terephthalate, 629 grams of 1,4-butanediol and 0.24 grams of the compound of Example 1 were charged in equipment similar to that described in Example 2. Nitrogen gas was slowly passed over the heated mixture, and stirring started at 145° centigrade. The temperature of the reactants was slowly raised to 225° centigrade as the methanol distilled out. 65 minutes were necessary to collect 248 cubic centimeters of distillates which corresponded to the theoretical amount of methanol. The distillation was continued for an additional 30 minutes to remove the excess glycol and byproducts. The nitrogen gas was shut off and the pressure of the system was reduced over a period of 45 minutes to 0.5 millimeters of mercury pressure while the excess glycol was distilled out. The batch temperature was raised to 250° centigrade and the polymerization was continued until a polymer having a relative viscosity of 14.3 was obtained which was accomplished in 145 minutes.

The polymer was of excellent quality and fibers with properties for commercial application were spun following conventional melt spinning procedures.

EXAMPLES 17–25

In accordance with the procedure described in Example 16, various other catalysts were evaluated to determine how efficient they were for the condensation of dimethyl terephthalate and 1,4-butanediol. Table I, presented below, indicates the catalyst used, the amount of catalyst used, the ester-interchange time, etc. "Relative viscosity" as used herein is a measure of the degree of polymerization of the polymer and is the ratio of the viscosity of an eight percent solution (8 grams of polymer dissolved in 100 millimeters of freshly distilled ortho-chlorophenol at a temperature of 100° centigrade) to the viscosity of freshly distilled ortho-chlorophenol measured in the same units at 25° centigrade.

TABLE I

Catalyst Comparison For Polymerization of Polytetramethylene Terephthalate

| EX | DMT/1,4-BUTANE-DIOL MOLE RATIO | ESTER-INTERCHANGE CATALYST | CATALYST CONCENTRATION WT. % (1) | CYCLE IN MINS. (2) | POLYCONDENSATION CATALYST | CATALYST CONCENTRATION WT % (1) | CYCLE IN MINS. (3) | REL. VISC. | TOTAL EI & PC MINUTES |
|---|---|---|---|---|---|---|---|---|---|
| 16 | 1/2.26 | COMPOSITION OF EXAMPLE 1 | 0.04 | 65 | None (4) | None | 145 | 14.3 | 210 |
| 17 | 1/2.26 | ZnAcetate.2H₂O | 0.4 | 330 | Sb₂O₃ | 0.4 | 525 | 14.3 | 855 |
| 18 | 1/2.26 | Ti(OC₄H₉)₄ | 0.04 | 90 | None | None | 200 | 14.3 | 290 |
| 19 | 1/2.26 | Ti(OC₃H₇)₄ | 0.2 | 255 | None | None | 185 | 21.8 | 540 |
| 20 | 1/2.26 | ZnAcetate.2H₂O | 0.12 | 300 | Stannous Oxalate | 0.07 | 190 | 23.6 | 490 |
| 21 | 1/2.26 | Tin Tetraisopropoxide | 0.1 | 420 | Zinc Oxide | 0.05 | 180 | 14.5 | 600 |
| 22 | 1/2.26 | Zinc Acetate | 0.15 | 210 | Stannous Oxalate | 0.07 | 180 | 21.7 | 390 |
| 23 | 1/2.26 | PbO | 0.10 | 180 | Zinc Oxide | 0.05 | 487 | 14.3 | 667 |
| 24 | 1/2.26 | Zinc Acetate | 0.035 | 180 | Zinc Oxide | 0.05 | DID NOT POLYMERIZE | | |
| 25 | 1/2.26 | Zinc Acetate | 0.035 | 355 | Sb₂O₅ | 0.04 | DID NOT POLYMERIZE | | |

(1) Wt. % based on the DMT charge
(2) Ester-interchange time span from charge of reactants to autoclave
(3) Time span from beginning of vacuum letdown
(4) "None" means that no additional catalyst was added for polycondensation and that the catalyst added for ester-interchange served a dual catalytic function, being both an ester-interchange and polycondensation catalyst.

Some of the novel organo-titanium compounds of this invention have an unobvious effect — they nucleate the polymer formed in the reaction between dimethyl terephthalate and 1,4-butanediol. Thus, e.g., poly(tetramethylene terephthalate) polymer prepared in the presence of a catalytic amount of the compound of Example 1 is nucleated, and there is a preferential cross-fiber orientation in the yarn made from this polymer. Differential scanning calorimetry showed this nucleating effect. A sample of this poly(tetramethylene terephthalate) with a relative viscosity of 26.1 was heated to 250° centigrade and then immediately cooled at a rate of 5° per minute. The melting point (expressed in degrees centigrade) was 226.5 and the crystallization transition on cooling (expressed in degrees centigrade) was 195. This compares favorably with poly(tetramethylene terephthalate) polymer made in the presence of zinc acetate as the ester-interchange catalyst and zinc oxide as the polycondensation catalyst, which polymer had a relative viscosity of 26.1, a melting point of 225°, and a crystallization transition on cooling of 190°.

This nucleation effect shows up when polymer produced in, e.g., the presence of the compound of Exammple 1 is spun. Table II illustrates the birefringences of yarns spun at 260° centigrade and wound up at 2000 feet per minute.

TABLE II

| Catalyst System Used To Make Polymer | Spun Yarn Birefringence × 10³ |
|---|---|
| Zinc oxide/zinc acetate | 84 |
| 0.1 percent of the compound of Example 1 | −10 |
| Titanium tetraisopropoxide | 46 |

The negative birefringence of yarn made from polymer which was made in the presence of the compound of claim 1 may be due to the cross-fiber orientation of crystallites nucleated by this compound. It is believed that this yarn is novel and unobvious.

EXAMPLE 26

600.0 grams of dimethyl terephthalate, 423.0 grams of ethylene glycol and 0.24 grams of the compound of Example 1 were charged in a 2-liter stainless steel reactor which was equipped with a nitrogen gas inlet tube, a stirrer, a distilling column and a temperature measuring device. Nitrogen gas was slowly passed over the heated mixture, and stirring started at 145° centigrade. The temperature of the reactants was slowly raised to 22520 centigrade as methanol distilled out. Approximately the theoretical amount of methanol was distilled out of the reaction vessel, showing the esterinterchange reaction to be complete in 110 minutes. The temperature was then raised from 270° to 280° centigrade in 20 minutes while the excess of glycol distilled out. The nitrogen gas was shut off and the pressure of the system was reduced over a period of 45 minutes to 0.5 millimeters of mercury pressure. The polymerization was continued until a polymer having a relative viscosity of 14.3 was obtained. The entire polymerization step was completed in 80 minutes.

Fibers with good properties were spun from the melt following conventional melt spinning procedures.

EXAMPLES 27–30

In accordance with the procedure of Example 26, various other catalysts were tested. The results are shown in Table III.

tigrade. The reactants were gently heated to 60° centigrade under constant stirring. Reaction was continued under reduced pressure at 20–25 millimeters of mercury pressure for a period of 2.0 hours. The batch temperature was slowly raised to 200° centigrade reducing the pressure slowly down to 4.0 millimeters of mercury pressure in a period of 3.0 hours. The reaction product was extremely viscous and upon cooling had the appearance of a tan solid.

0.24 grams of this compound, 600.0 grams of dimethyl terephthalate, and 629 grams of 1,4-butanediol were charged into a reaction vessel. Nitrogen gas was slowly passed over the heated mixture and stirring started at 145° centigrade. The temperature of the reactants was slowly raised to 225° centigrade as the methanol distilled out. 70 minutes were necessary to collect 247 cubic centimeters of distillates which corresponded to the theoretical amount of methanol. The distillation was continued for an additional 30 minutes to remove the excess glycol and by-products. The nitrogen gas was shut off and the pressure of the system was reduced over a period of 45 minutes to 0.5 millimeters of mercury pressure while the excess glycol was distilled out. The batch temperature was raised to 250° centigrade and the polymerization was continued until a polymer having a relative viscosity of 14.3 was obtained which was accomplished in 95 minutes.

EXAMPLES 32–40

In accordance with the procedure of Example 31, various other catalysts were tested. The results are shown on Table IV.

EXAMPLE 41

0.24 grams of the catalyst compound described in Example 31, 600.0 grams of dimethyl terephthalate, and 423.0 grams of ethylene glycol were charged in a 2-liter stainless steel reactor which was equipped with a nitrogen gas inlet tube, a stirrer, a distilling column and a temperature measuring device. Nitrogen gas was slowly passed over the heated mixture and stirring started at 145° centigrade. The temperature of the reactants was slowly raised to 225° centigrade as meth-

TABLE III

Comparison of Catalysts for Polyethylene Terephthalate

| EX | WT. % OF CATALYST (1) | ESTER-INTERCHANGE CATALYST SYSTEM | E.I. (2) (MINUTES) | WT. % (1) | POLYCONDENSATION CATALYST SYSTEM | POLYCONDENSATION (3) MINUTES | RELATIVE VISCOSITY | TOTAL EI & PC (MINUTES) |
|---|---|---|---|---|---|---|---|---|
| 26 | 0.04 | COMPOSITION OF EXAMPLE 1 | 110 | None | None | 80 | 14.3 | 190 |
| 27 | 0.04 | MgCO₃ | 150 | 0.04 | Sb₂O₅ | 170 | 14.3 | 320 |
| 28 | 0.04 | ZnAcetate.2H₂O | 160 | 0.04 | Sb₂O₅ | 120 | 14.3 | 280 |
| 29 | 0.04 | ZnAcetate.2H₂O | 160 | 0.04 | GeO₂ | 175 | 14.3 | 335 |
| 30 | 0.04 | Ti(OC₄H₇)₄ | 130 | None | None | 109 | 14.3 | 239 |

(1) WT. % based on the DMT charge
(2) Ester-interchange time span from charge of reactant to autoclave
(3) Time span from beginning of vacuum letdown

EXAMPLE 31

330.5 grams (1.5 moles) of diphenylsilanediol was charged in a one-liter reactor which was equipped with nitrogen gas inlet, stirrer, vacuum distillation set-up and a temperature measuring device. 426.3 grams (1.5 moles) of tetraisopropyl titanate was added in a period of 5 minutes. An exothermic reaction was observed which raised the temperature of the system to 38° cenanol distilled out. Approximately the theoretical amount of methanol was distilled out of the reaction vessel, showing the ester-interchange reaction to be complete in 110 minutes. The temperature was then raised from 270° to 280° centigrade in 20 minutes while the excess glycol distilled out. The nitrogen gas was shut off and the pressure of the system was reduced over a period of 45 minutes to 0.5 millimeters of mercury pressure. The polymerization was continued until a polymer having a relative viscosity of 14.3 was obtained. The entire polymerization step was completed in 80 minutes.

Fibers with good properties were spun from the melt following conventional melt spinning procedures.

EXAMPLES 42–45

In accordance with the procedure of Example 41, various other catalysts were tested. The results are shown in Table V.

EXAMPLE 46

In accordance with the procedure described in Example 16, 600 grams (3.09 moles) of dimethyl terephthalate and 389 grams (4.32 moles) of 1,4-butanediol were reacted in the presence of 0.6 grams of the product of Example 13; this product served as both an ester-interchange and polycondensation catalyst.

effected at a temperature of 258° centigrade. The ester-interchange cycle was 60 minutes, and the polycondensation cycle was 30 minutes; a polymer with a relative viscosity of 27.69 was obtained.

EXAMPLE 48

In accordance with the procedure described in Example 46, 600 grams of dimethyl terephthalate, 432 grams of ethylene glycol, 0.102 grams of zinc acetate, and 1.2 grams of the reaction product of Example 15 were allowed to react. The ester-interchange cycle time was about 2.5 hours, and the polycondensation cycle was about 50 minutes. A very while polymer was obtained having an intrinsic viscosity of 0.507.

EXAMPLE 49

2723.6 grams of diphenysilanediol (12.59 moles) were placed in a reaction flask, the reaction flask was

TABLE IV

Comparison of Catalysts for the Preparation of Polytetramethylene Terephthalate

| EX | DMT/1,4-BUTANE-DIOL MOLE RATIO | ESTER-INTERCHANGE CATALYST | CATALYST CONCENTRATION WT. %(1) | CYCLE IN MINUTES (2) | POLYCONDENSATION CATALYST | CATALYST CONCENTRATION WT. %(1) | CYCLE IN MINUTES (3) | REL. VISC. | TOTAL EI & PC MINUTES |
|---|---|---|---|---|---|---|---|---|---|
| 31 | 1.2/2.6 | COMPOSITION OF EXAMPLE | 0.04 | 70 | None | None | 95 | 21.6 | 165 |
| 32 | 1/2.26 | ZnAcetate.2H$_2$O | 0.4 | 330 | Sb$_2$O$_3$ | 0.4 | 525 | 14.3 | 855 |
| 33 | 1/2.26 | Ti(OC$_4$H$_9$)$_4$ | 0.04 | 90 | None | None | 200 | 14.3 | 290 |
| 34 | 1/2.26 | Ti(OC$_3$H$_7$)$_4$ | 0.2 | 255 | None | None | 185 | 21.8 | 540 |
| 35 | 1/2.26 | ZnAcetate.2H$_2$O | 0.12 | 300 | Stannous Oxalate | 0.07 | 190 | 23.6 | 490 |
| 36 | 1/2.26 | Tin Tetraiso$^2$ propoxide | 0.1 | 420 | Zinc Oxide | 0.05 | 180 | 14.5 | 600 |
| 37 | 1/2.26 | ZincAcetate | 0.15 | 210 | Stannous Oxalate | 0.07 | 180 | 21.7 | 390 |
| 38 | 1/2.26 | PbO | 0.10 | 180 | Zinc Oxide | 0.05 | 487 | 14.3 | 667 |
| 39 | 1/2.26 | Zinc Acetate | 0.035 | 180 | Zinc Oxide | 0.05 | DID NOT POLYMERIZE | | |
| 40 | 1/2.26 | Zinc Acetate | 0.035 | 355 | Sb$_2$O$_5$ | 0.04 | DID NOT POLYMERIZE | | |

(1) WT. % based on the DMT charge
(2) Ester-interchange time span from charge of reactants to autoclave
(3) Time span from beginning of vacuum letdown

TABLE V

Comparative Results for Preparation of PET with Various Catalysts

| EX | WT. % OF CATALYST (1) | ESTER-INTERCHANGE CATALYST SYSTEM | E.I. (2) (MINUTES) | WT.%(1) | POLYCONDENSATION CATALYST SYSTEM | POLYCONDENSATION (3)MINUTES | RELATIVE VISCOSITY | TOTAL EI & PC (MINUTES) |
|---|---|---|---|---|---|---|---|---|
| 41 | 0.04 | COMPOSITION OF EXAMPLE 31 | 110 | None | None | 80 | 14.3 | 190 |
| 42 | 0.04 | MgCo$_3$ | 150 | 0.04 | Sb$_2$O$_5$ | 170 | 14.3 | 320 |
| 43 | 0.04 | ZnAcetate.2H$_2$O | 160 | 0.04 | Sb$_2$O$_3$ | 120 | 14.3 | 280 |
| 44 | 0.04 | ZnAcetate.2H$_2$O | 160 | 0.04 | GeO$_2$ | 175 | 14.3 | 335 |
| 45 | 0.04 | Ti(OC$_4$H$_7$)$_4$ | 130 | None | None | 109 | 14.3 | 239 |

(1) WT. % based on the DMT charge
(2) Ester-interchange time span from charge of reactant to autoclave
(3) Time span from beginning of vacuum letdown The polymerization was effected at a temperature of 258° centigrade. The ester interchange cycle was 75 minutes, and the polycondensation cycle was 75 minutes. A polymer with 20.37 relative viscosity was obtained.

EXAMPLE 47

In accordance with the procedure described in Example 46, 600 grams of dimethyl terephthalate and 389.0 grams of 1,4-butanediol were reacted in the presence of 0.3 grams (0.06 weight percent based on dimethyl terephthalate) of the product of Example 14; this product was used as both the ester-interchange and polycondensation catalyst. The polymerization was purged with nitrogen, and thereafter 5246.5 grams of tetraethoxysilane (25.18 moles) and a solution of 2.5 grams of sodium hydroxide in 1500 cubic centimeters of ethanol were sequentially added. Heat was applied, and agitation of the reaction mixture was started. At about 50° centigrade, a vacuum was slowly imposed and the reaction started. A vacuum of 325 millimeters of mercury absolute was imposed over a period of 3.5 to 4 hours, and during this time the temperature of the reaction mixture was raised to 130° centigrade. The reaction was then stopped. 6656 grams of product were obtained in 97.5 percent yield.

In accordance with Example 26, 30 pounds of dimethyl terephthalate and 21.6 pounds of ethylene glycol were reacted in the presence of 2.38 grams of zinc acetate ester-interchange catalyst. After the ester-interchange was completed, 41 grams of the silicon compound produced by the procedure of this example and 47.6 grams of titanium dioxide were added to the reaction mixture, and polycondensation was conducted in accordance with Example 26 for 95 minutes (a control wherein magnesium carbonate had been used for the ester-interchange catalyst and antimony trioxide as the polycondensation catalyst took 120 minutes for polycondensation). A polymer was obtained which had a melting point of 260° centigrade, a luminescence of 84, and a yellowness of 4. The luminescence and yellowness determinations were done in accordance with the C.I.E. chromaticity coordinates test on a Colormaster machine (a differential colorimeter produced by Manufacturers Engineering and Equipment Corporation).

The use of the catalyst of this example is one of the cheapest and most efficient means known to applicant to obtain very white polyester polymer.

EXAMPLE 50

30.0 pounds of terephthalic acid, 22.4 pounds of ethylene glycol, and 0.79 grams of sodium hydroxide were reacted at a temperature of from about 200° to about 250° centigrade in a stirred autoclave fitted with a fractionating column, a condenser, and a receiver suitable for operation under pressure. The system was vented to atmospheric pressure during the initial heating of the reaction mixture to 200° centigrade. Thereafter the batch temperature was increased to about 240° centigrade and the pressure was increased to 50 p. s. i. g. with deoxidized nitrogen. As esterification proceeded, water and other by-products were periodically bled off, and the pressure was maintained at about 50 p. s. i. g. throughout the reaction. When the reaction mixture was clear, the pressure was decreased to atmospheric pressure in about 10 minutes. 6.3 pounds of distillates were collected. The excess of ethylene glycol was distilled out under a vacuum of 8 inches of mercury over a period of about 1 hour.

55.6 grams of titanium dioxide delustrant were then added to the mixture, and about 5 minutes later 31.8 grams of the compound described in Example 49 were added to a mixture. The polycondensation was then carried out at a temperature of 280°–284° centigrade and 0.2 millimeter mercury pressure for 55 minutes until a polymer with an intrinsic viscosity of 0.60 was obtained.

EXAMPLE 51

In substantial accordance with the procedure described in Example 1, 12.5 pounds of terephthalic acid, 3750 pounds of 1,4-butanediol, and 10 grams of the compound described in Example 1 were reacted at a temperature of about 224° centigrade. The esterification reaction was stopped when 21.3 pounds of distillates had been collected. Thereafter polycondensation was conducted at a temperature of about 250° centigrade for 145 minutes until a polymer with a relative viscosity of 30 was obtained.

EXAMPLE 52

4.4-sulphonyl dibenzoic acid dibutyl ester (1254 parts) and 2.2 dimethyl propane 1.3 diol (468 parts) were placed in a vessel equipped with a stirrer, a short distillation column, and a gas inlet tube for the entrance of nitrogen. 0.2 parts of the compound of Examples 1 in 2 parts of butanol were added as a catalyst. The reaction mixture was stirred at 230°–240° centigrade until distillation of butanol was complete. The temperature was then raised to 295° centigrade and a vacuum of 1 millimeter applied for 1.5 hours. The product obtained has a viscosity ratio of 1.66 (1% solution in ochlorophenol at 25° centigrade).

The compounds of this invention are useful as catalysts for many reactions involving the reaction of diacid or a diester with a glycol. Thus, e.g., th following acid and ester reactants may be used in the process of this invention: a compound of the formula

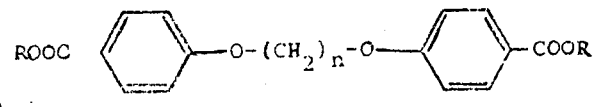

(wherein n is from 1 to about 10 and R is lower alkyl of 1 to about 8 carbon atoms) such as 1,2-di(p-methylcarboxyphenoxy) ethane; a compound of the formula

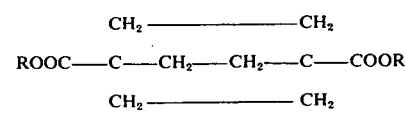

(wherein R is lower alkyl or hydrogen) such as 1,4-bicyclo (2,2,2) octane dicarboxylic acid; a compound of the formula

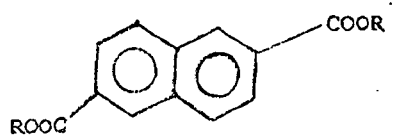

(wherein R is hydrogen or lower alkyl) such as 2,6-naphthalene dicarboxylic acid; 4-hydroxymethylbenzoic acid; a compound of the formula

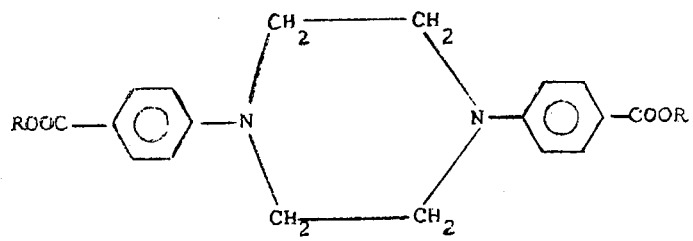

(wherein R is hydrogen or lower alkyl) such as 1,4-bis(4-carboxyphenyl piperazine; biphenyl-4,4-dicarboxylic acid and the lower alkyl esters thereof; a compound of the formula

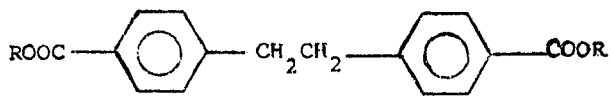

(wherein R is hydrogen or lower alkyl) such as 1,2-bis(4-carboxyphenyl) ethane; di(4-carboxyphenyl) sulfone; furan-2,5-dicarboxylic acid and the lower alkyl esters thereof; 1,2-bis(4-carboxybenzamido) ethane and the lower alkyl esters thereof; 1,4-cyclohexanedicarboxylic acid and the lower alkyl esters thereof; 4,4'-dicarboxy-2,2'-diphenylpropane and the lower alkyl esters thereof; and the like. Thus, e.g., the following diol reactants may be used in the process of this invention; 1,4-bicyclo(2,2,2)octanedimethanol; 1,4-cyclohexanedimethanol; a compound of the formula

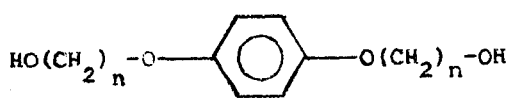

(wherein $n$ is from 1 to about 8) such as 1,4-bis(3-hydroxypropoxy) benzene; a compound of the formula

such as 1,4-bis(3-hydroxypropyl) benzene; and the like. It is to be understood that this list is merely illustrative and that many other acds, esters, and glycols may be used in the process of applicant's invention.

The use of the catalyst described in Example 49 (and the analogs thereof described, e.g., in claims 16–22) enables one to obtain "superwhite" polyester polymer and textile materials with very high luminance and remarkably little yellowness. Said polyester polymer has a luminance greater than about 60, and the textile material made therefrom (such as, e.g., fiber, yarn, fabric, etc.) has a luminance greater than about 70. The yellowness of the polymer is relatively low, so that the luminance minus the yellowness (the "L-Y" parameter which is some indication of how bright the polymer appears to be) is greater than about 55 for the polymer. It is preferred that the polymer's L-Y be about 65, and it is most preferred to have an L-Y of about 70. The above "L" and "Y" values are determined in accordance with the procedure set forth in the *Model 5 Colormaster Colorimeter Instruction Manual* published by the Manufacturers Engineering Corporation of Warrington, PA.

The superwhite polyester polymer and textile materials of this invention are comprised of from about 30 to about 3000 parts per million (by weight of polymer or textile material) of silicon, said silicon being provided by a silicon compound soluble in the polymer or textile material. Thus, e.g., for the purpose of this invention a fiber, e.g., which was comprised of 300 parts per million of silicon from a soluble silicon compound and 400 parts per million of silicon from silica is considered to be comprised of only 300 parts per million of silicon;

the amount of silicon provided by the insoluble silicon compound is to be disregarded. It is preferred that the polymer or textile material be comprised of from about 100 to about 500 parts per million of silicon, although it is more preferred that it be comprised of from about 200 to about 400 parts per million of silicon. In the most preferred embodiment, the polymer or textile material is comprised of about 300 parts per million of silicon.

Although applicant has very specifically described many aspects of this invention, many other modifications will suggest themselves to those skilled in the art upon a reading of this disclosure. These are intended to be comprehended within the scope of this invention.

What is claimed is:

1. As a catalyst suitable for use in the preparation of polyester polymers, a viscous liquid or paste product of the process of reacting a first compound of the formula

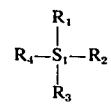

with a second compound of the formula

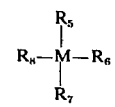

in quantities of from about 1.1 to about 20 moles of said second compound per mole of said silicon compound, wherein:
  a. M is tin;
  b. $R_2$ and $R_4$ are selected from the group consisting of chlorine and hydroxy;
  c. the reacting R substituents are selected from the group consisting of alkyl of 1 to about 18 carbon atoms, aryl of 6 to about 18 carbon atoms, alkoxy of 1 to about 18 carbon atoms, and aryloxy of 6 to about 16 carbon atoms;
  d. in said reaction said first compound and said second compound are reacted for from about 2 to about 6 hours; and
  e. after said first compound and said second compound have been reacted with each other for from about 2 to about 6 hours, the reaction mixture is subjected to a vacuum of less than about 600 millimeters of mercury absolute for at least 30 minutes.

2. The product of claim 1 wherein:
  a. $R_1$ and $R_2$ are selected from the group consisting of alkyl of from 1 to about 18 carbon atoms, an aryl of from 6 to about 18 carbon atoms; and
  b. $R_5$, $R_6$, $R_7$, and $R_8$ are selected from the group consisting of phenyl, alkyl of 1 to about 18 carbon atoms and alkoxy of 1 to about 18 carbon atoms.

3. The product of claim 2 wherein said first compound and said second compound are reacted with each other for from about 1.0 to about 6 hours at a reaction temperature of from about 50° to about 250° centigrade.

4. The product of claim 3 wherein:
  a. $R_1$ and $R_3$ are phenyl; and
  b. $R_5$, $R_6$, $R_7$, and $R_8$ are selected from the group consisting of alkyl of 1 to about 8 carbon atoms and alkoxy of 1 to about 8 carbon atoms.

* * * * *

UNITED STATES PATENT OFFICE
CERTIFICATE OF CORRECTION

Patent No. 3,927,052      Dated December 16, 1975

Inventor(s) LOUIS VIZURRAGA

It is certified that error appears in the above-identified patent and that said Letters Patent are hereby corrected as shown below:

Column 4, line 15, the word "aicd" should read -- acid --

Column 3, line 41, "$R_3$" should read -- $R_2$ --

Column 4, line 51, formula should read as follows:

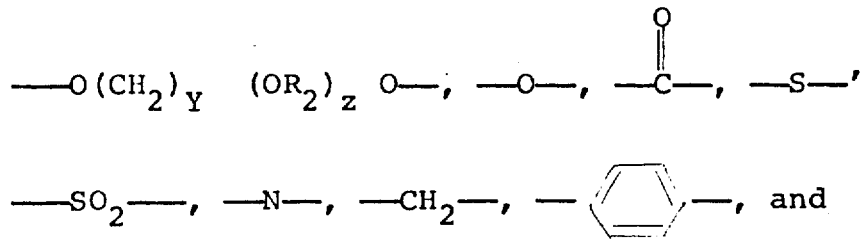

Column 15, line 25, "22520" should read -- 225° --.

Column 18, line 13, "while" should read -- white --.

Column 20, the second formula should read as shown below:

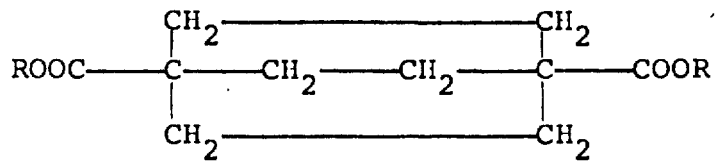

Signed and Sealed this

Ninth Day of November 1976

[SEAL]

Attest:

RUTH C. MASON      C. MARSHALL DANN
*Attesting Officer*      *Commissioner of Patents and Trademarks*